(12) United States Patent
DeKarske et al.

(10) Patent No.: US 8,276,931 B2
(45) Date of Patent: Oct. 2, 2012

(54) DUAL TOW BALL COUPLING APPARATUS

(75) Inventors: David Allen DeKarske, Waterford, MI (US); Thomas M. Williams, Jr., Durham, NC (US)

(73) Assignee: Williams Innovations, LLC, Research Triangle Park, NC (US)

( * ) Notice: Subject to any disclaimer, the term of this patent is extended or adjusted under 35 U.S.C. 154(b) by 0 days.

(21) Appl. No.: 13/036,684

(22) Filed: Feb. 28, 2011

(65) Prior Publication Data

US 2012/0217725 A1    Aug. 30, 2012

(51) Int. Cl.
    *B60D 1/60*         (2006.01)
(52) U.S. Cl. ...................................................... 280/507
(58) Field of Classification Search ................... 280/507, 280/511, 416.1
See application file for complete search history.

(56) References Cited

U.S. PATENT DOCUMENTS

| | | | |
|---|---|---|---|
| 3,922,006 A * | 11/1975 | Borges | ........................ 280/416.1 |
| 4,032,171 A | 6/1977 | Allen et al. | |
| 4,440,005 A | 4/1984 | Bulle | |
| 4,552,377 A | 11/1985 | Folkerts | |
| 4,774,823 A | 10/1988 | Callison | |
| D312,958 S | 12/1990 | Aguilar, Jr. | |
| 5,087,064 A | 2/1992 | Guhlin | |
| D356,764 S * | 3/1995 | Thixton et al. | ................ D12/162 |
| 5,725,229 A * | 3/1998 | McWethy | .................. 280/416.1 |
| 5,908,201 A | 6/1999 | Van Vleet | |
| 6,467,317 B1 | 10/2002 | Hillabush et al. | |
| 6,698,256 B2 | 3/2004 | Witchey | |
| 6,789,815 B2 | 9/2004 | Moss et al. | |
| 7,044,494 B1 * | 5/2006 | Cowett | .......................... 280/512 |
| 7,121,121 B2 | 10/2006 | Wyers | |
| 7,125,036 B2 | 10/2006 | Moss et al. | |
| 7,275,754 B2 | 10/2007 | Scharmuller | |
| 7,735,848 B2 | 6/2010 | Konsela | |
| 2007/0102898 A1 * | 5/2007 | Schulze | ......................... 280/507 |
| 2007/0108732 A1 | 5/2007 | Silva, II | |

* cited by examiner

*Primary Examiner* — Tony Winner
(74) *Attorney, Agent, or Firm* — Myers Bigel Sibley & Sajovec, P.A.

(57) ABSTRACT

A coupling apparatus includes a base, an arm extending from the base, a first tow ball extending from a first side of the arm, and a second tow ball extending from an opposite second side of the arm. The base is configured to be removably attached to a vehicle in opposite first and second positions such that the first tow ball is in an upright orientation when the base is attached to a vehicle in the first position, and the second tow ball is in an upright orientation when the base is attached to a vehicle in the second position. Each of the first and second end portions of the base includes a respective post, and a retainer assembly is configured to be removably attachable to each post.

17 Claims, 10 Drawing Sheets

DUAL TOW BALL COUPLING APPARATUS

FIELD OF THE INVENTION

The present invention relates generally to vehicle towing and, more particularly, to towing apparatus.

BACKGROUND

Tow hitch assemblies are commonly used for the towing of one vehicle by another and conventionally comprise a tow ball secured on the rear of a towing vehicle and a coupler or socket for the tow ball attached to a trailer or towed vehicle. Although it is desirable to tow different types of trailers/vehicles behind the same vehicle, different trailers/vehicles may have couplers which differ in structure and configuration and which do not fit or mate with the tow ball attached to the towing vehicle. In order to tow a trailer/vehicle with a non-matching coupler, the tow ball must be removed and replaced with a different sized tow ball.

Anti-theft and safety devices for ball and socket type trailer hitches are conventionally utilized to prevent unintentional and unauthorized disengagement of a socket and tow ball. However, such devices can be complicated and difficult to use with tow balls of different sizes.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, a coupling apparatus includes a base, an arm extending from the base, a first tow ball extending from a first side of the arm, and a second tow ball extending from an opposite second side of the arm. The base is configured to be removably attached to a vehicle in opposite first and second positions. The first tow ball is in an upright orientation and ready for use when the base is attached to a vehicle in the first position, and the second tow ball is in an upright orientation and ready for use when the base is attached to a vehicle in the second position. Each of the first and second end portions of the base includes a respective post configured to receive a retainer assembly that prevents unintentional and unauthorized disengagement of a coupler from a respective tow ball. When the first tow ball is in an upright orientation, the retainer assembly is removably attached to the post at the base first end portion and is configured to retain an object (e.g., a coupler) extending around the first tow ball. When the second tow ball is in an upright orientation, the retainer assembly is removably attached to the post at the base second end portion and is configured to retain an object (e.g., a coupler) extending around the second tow ball.

In some embodiments of the present invention, the retainer assembly includes a latch that is rotatable between open and locked positions. A lever is operably associated with the latch and configured to move the latch between the open and locked positions. The lever has an end portion that engages a respective post to maintain the latch in the locked position, and the lever is rotatable relative to the latch such that the lever end portion disengages from the post and the latch can be moved to an open position. In some embodiments of the present invention, the retainer assembly includes a biasing element that urges the lever end portion into engagement with a respective post.

In some embodiments of the present invention, the base includes one or more openings formed therethrough. These openings are configured to align with respective openings in a structural/towing member of a vehicle. A fastener is configured to be inserted through the aligned openings to removably attach the base to the vehicle.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

DETAILED DESCRIPTION

Figure 1:
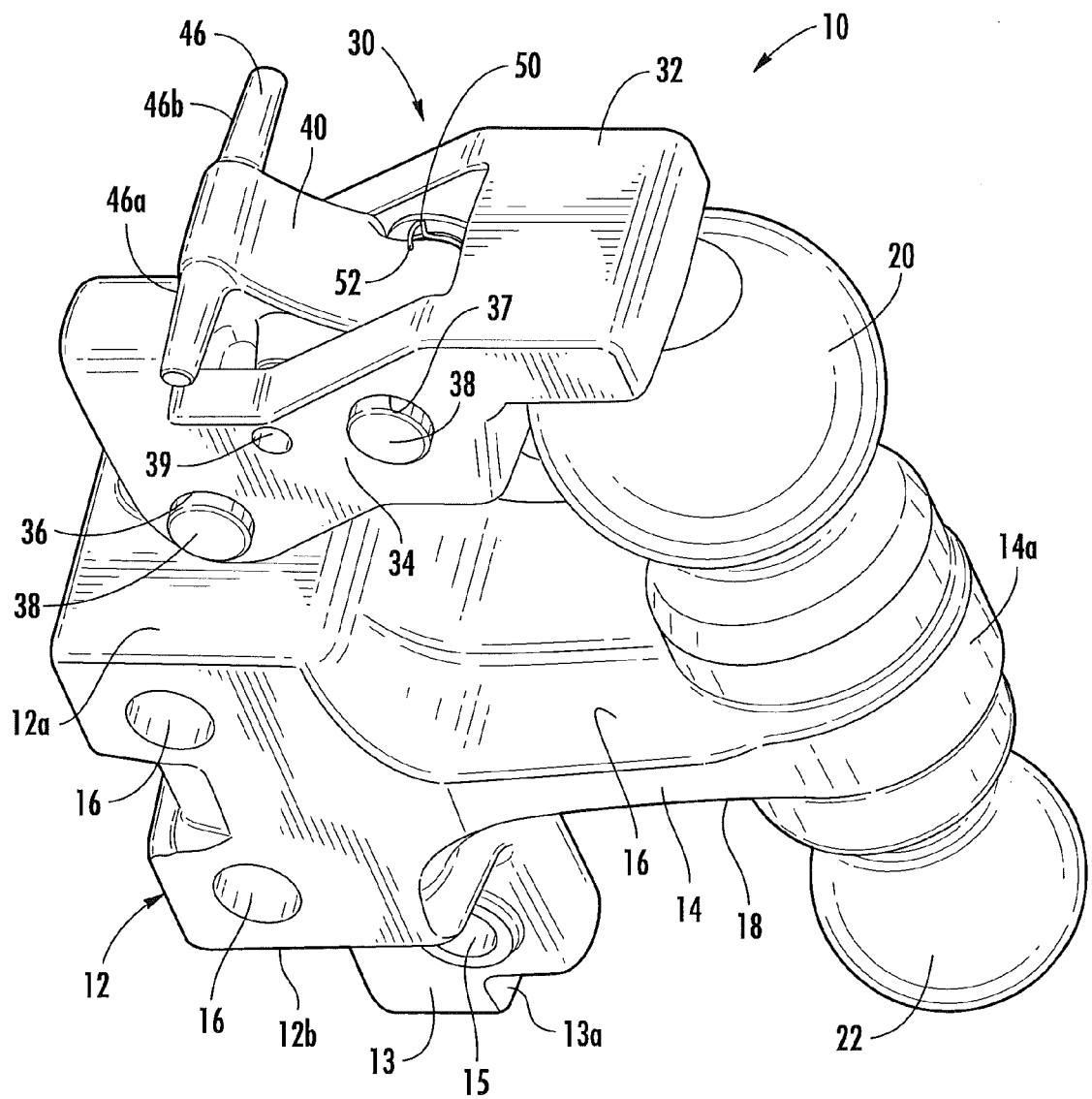
FIG. 1 is a top perspective view of a hitch coupling apparatus, according to some embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines may illustrate optional features or elements unless specified otherwise. In addition, the sequence of operations (or steps) is not limited to the order presented in the figures and/or claims unless specifically indicated otherwise. Features described with respect to one figure or embodiment can be associated with another embodiment of figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "vehicle" includes all types of vehicles including, but not limited to, automobiles, trucks, military vehicles, airplanes, trains, etc., and also includes towed vehicles and towing vehicles.

Figure 2:
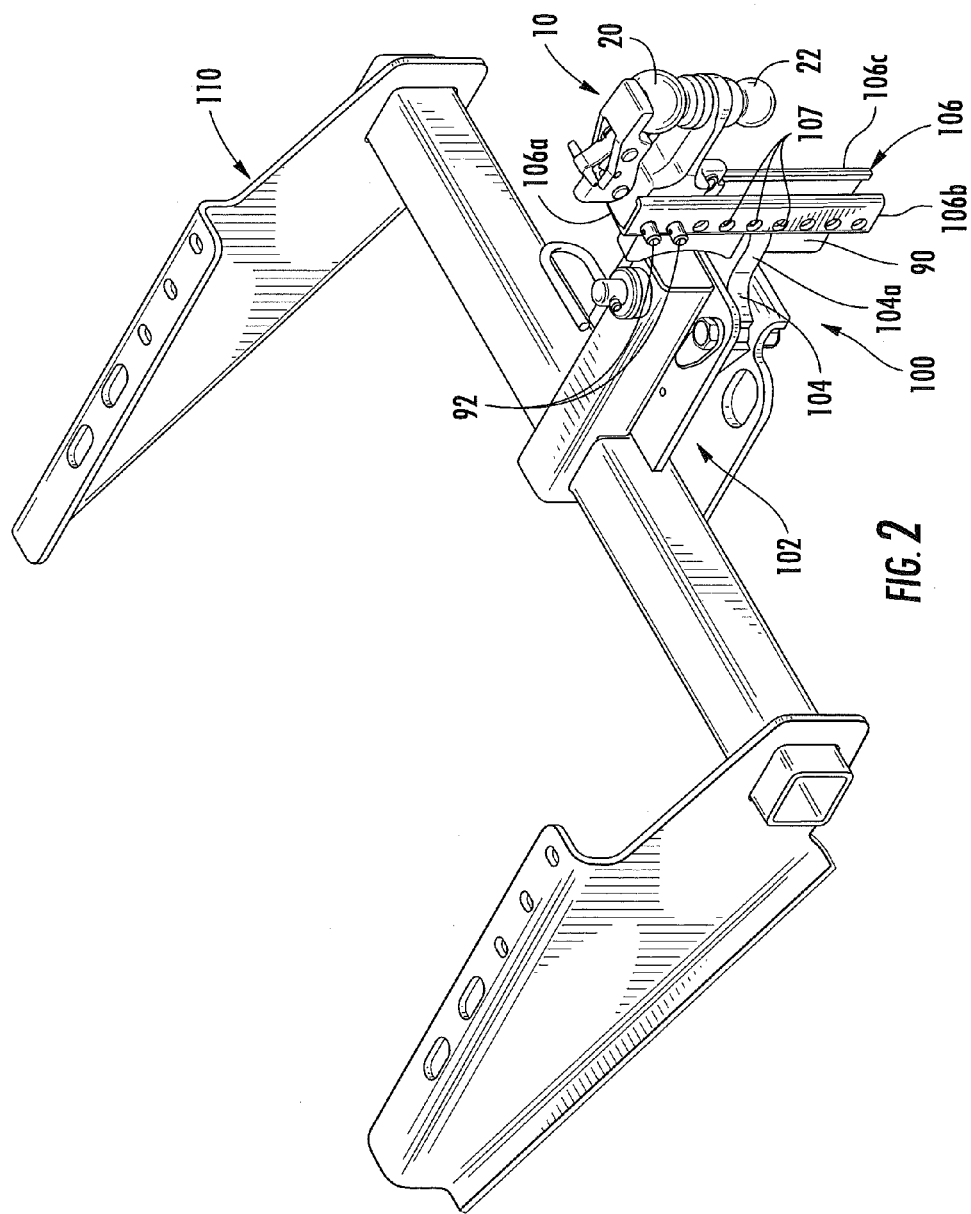
FIG. 2 is a top perspective view of a towing apparatus with the coupling apparatus of FIG. 1 removably secured thereto, according to some embodiments of the present invention.
Figure 3:
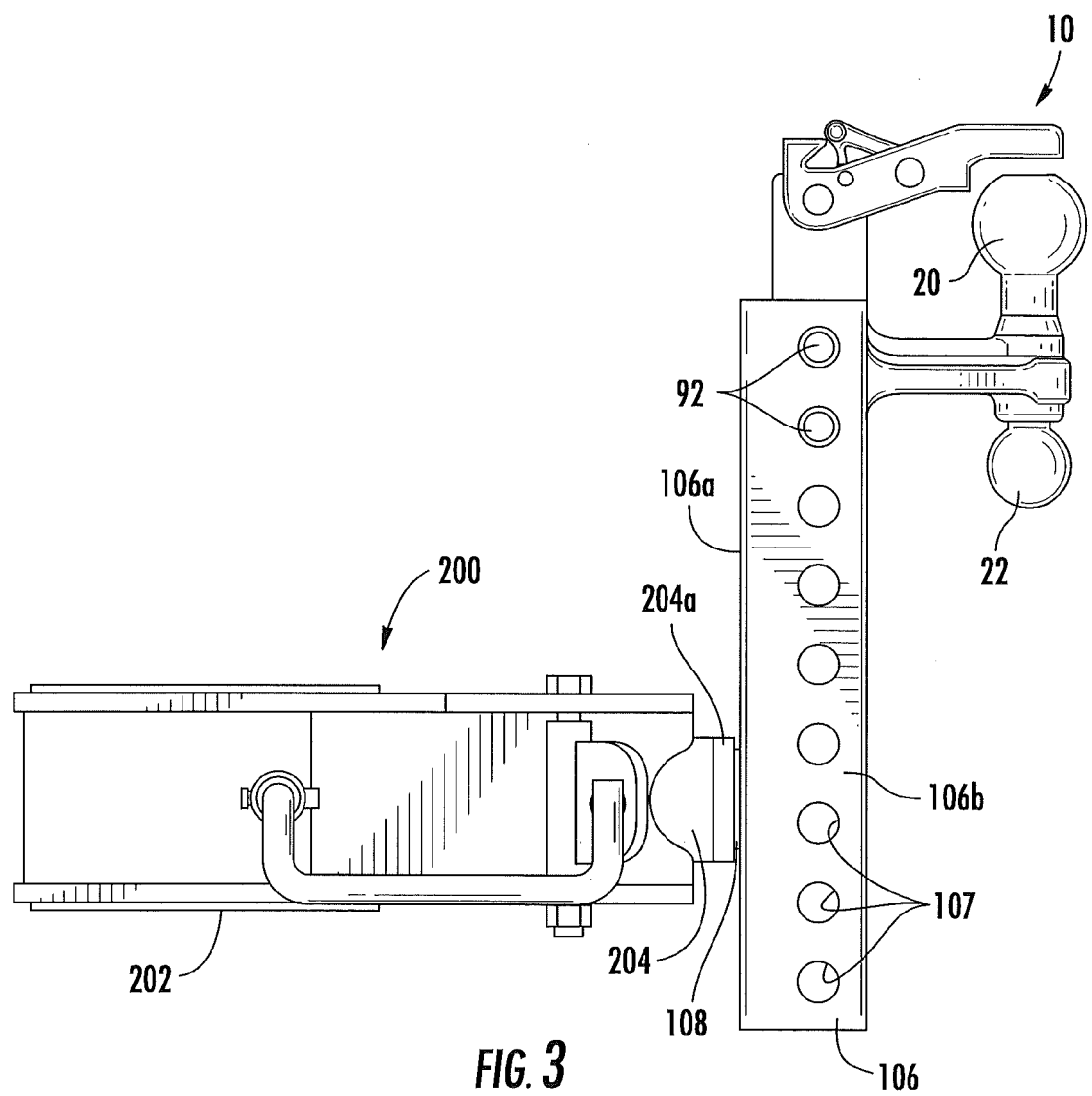
FIG. 3 is a side view of a towing apparatus with the coupling apparatus of FIG. 1 removably secured thereto, according to some embodiments of the present invention.
Figure 4:
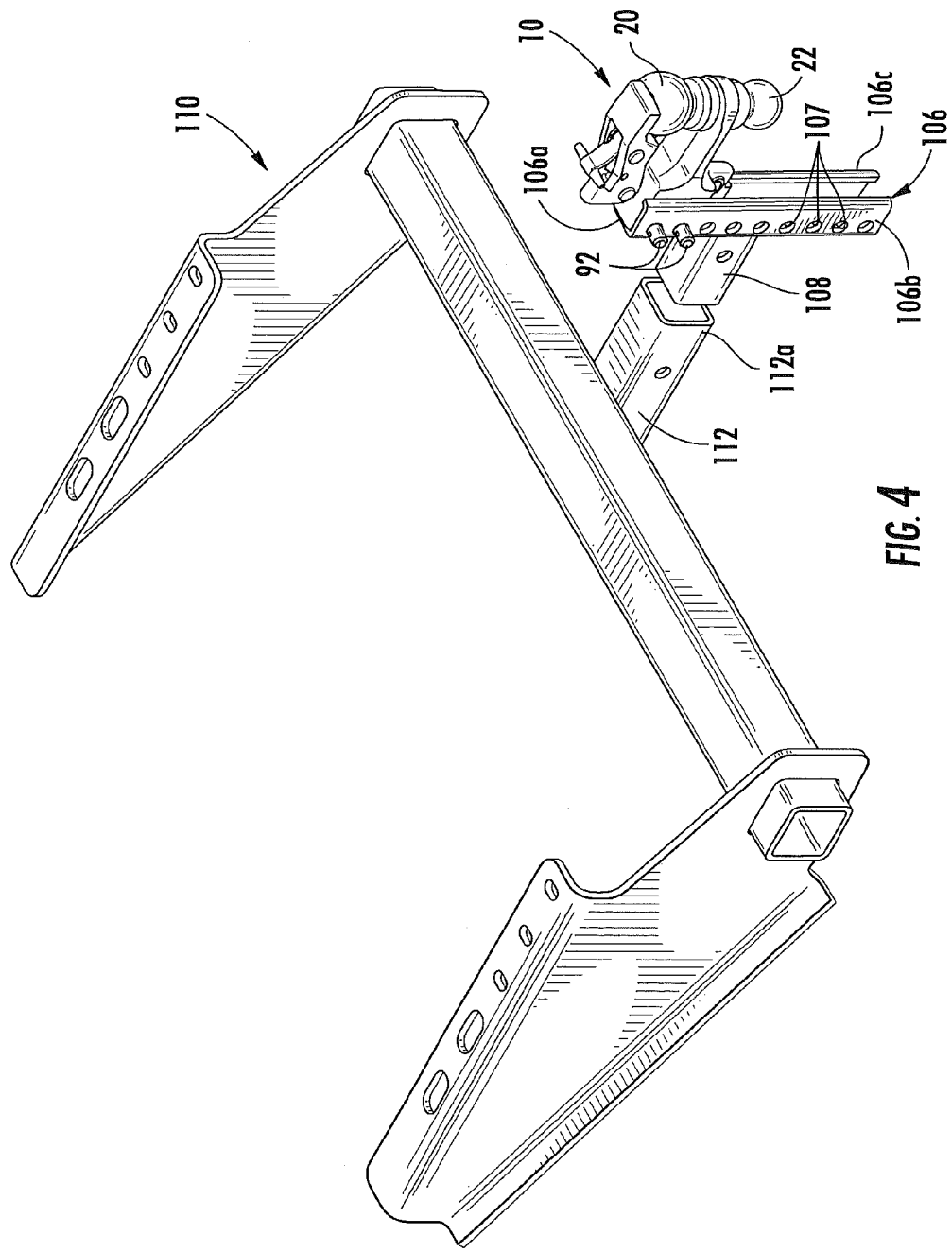
FIG. 4 is a top perspective view of a towing apparatus with the coupling apparatus of FIG. 1 removably secured thereto, according to some embodiments of the present invention.

Referring now to FIG. 1, a coupling apparatus 10, according to some embodiments of the present invention, is illustrated. The coupling apparatus 10 is configured to be mounted to a vehicle, and typically to a hitch apparatus attached to a vehicle. Exemplary hitch apparatus to which the coupling apparatus can be secured are illustrated in FIGS. 2-4. For example, in FIG. 2, the coupling apparatus 10 is illustrated being removably attached to a hitch apparatus 100 that is mounted to a vehicle via a frame 110. The illustrated hitch apparatus 100 includes a housing 102 and a tow bar 104 movably disposed within the housing 102. The tow bar 104 is movable relative to the housing 102 between retracted and extended positions, and is pivotable relative to the housing 102 when in extended positions. A mounting bracket 106 is secured to the distal end 104*a* of the tow bar 104 via a structural member 90 extending from the rear wall 106*a* of the mounting bracket 106. The coupling apparatus 10 is removably secured to the mounting bracket 106 via fasteners 92 and can be positioned such that either of the tow balls 20, 22 are in an upright orientation. In FIG. 2, tow ball 20 is in the upright orientation. The illustrated hitch apparatus 100 is described in further detail in U.S. patent application Ser. No. 12/727,597, which is incorporated herein by reference in its entirety.

In FIG. 3, the coupling apparatus 10 is illustrated being removably attached to a hitch apparatus 200. The hitch apparatus 200 is configured to be mounted to a vehicle, such as via a frame (e.g., frame 110 of FIG. 1). The hitch apparatus 200 may also be secured to a vehicle in other ways. The illustrated hitch apparatus 200 includes a housing 202 and a tow bar 204 movably disposed within the housing 202. The tow bar 204 is movable relative to the housing 202 between retracted and extended positions, and is pivotable relative to the housing 202 when in extended positions, similar to tow bar 104 of FIG. 2. A mounting bracket 106, to which the coupling apparatus 10 is removably secured, includes a member 108 extending outwardly from a rear wall 106*a* thereof. The tow bar 204 is a tubular member open at the distal end 204*a* thereof and configured to removably receive the member 108 extending from the rear wall 106*a* of the mounting bracket 106. The coupling apparatus 10 is removably secured to the mounting bracket 106 via fasteners 92 and can be positioned such that either of the tow balls 20, 22 are in an upright orientation. In FIG. 3, tow ball 20 is in the upright orientation. The illustrated hitch apparatus 200 is described in further detail in U.S. patent application Ser. Nos. 12/952,889 and 12/939,644, which are incorporated herein by reference in their entireties.

In FIG. 4, a frame 110 that is configured to be mounted to a vehicle includes a tubular receiving member 112. A mounting bracket 106, to which the coupling apparatus 10 is removably secured, includes a member 108 extending outwardly from a rear wall 106a thereof. The tubular receiving member 112 is open at a distal end 112a thereof and is configured to receive the member 108 extending from the rear wall 106a of the mounting bracket 106. The coupling apparatus 10 is removably secured to the mounting bracket 106 via fasteners 92 and can be positioned such that either of the tow balls 20, 22 are in an upright orientation. In FIG. 4, tow ball 20 is in the upright orientation.

The coupling apparatus 10 can be removably attached to any type of hitch apparatus without limitation. The hitch apparatus illustrated in FIGS. 2-4 are provided only for illustration. Moreover, the coupling apparatus 10 can be removably attached to a vehicle in various other ways without limitation.

Referring back to FIG. 1, the coupling apparatus 10 includes a base 12 and an arm 14 extending from the base 12. The arm 14 includes a free end 14a and opposite first and second sides 16, 18. A first tow ball 20 extends from the arm first side 16 adjacent the free end 14a and a second tow ball 22 extends from the arm second side 18 adjacent the free end 14a. The first and second tow balls 20, 22 have respectively different sizes to accommodate trailer couplers of different sizes, as would be understood by those skilled in the art of the present invention. For example, tow ball 20 may be a two inch (2") diameter ball and tow ball 22 may be a two and five sixteenths (2⁵⁄₁₆") ball. Various combinations of tow ball sizes may be utilized in accordance with embodiments of the present invention.

The coupling apparatus 10 may be a one piece forging in some embodiments. In other embodiments, the coupling apparatus 10 may be two or more components secured together, for example, via welding. In some embodiments, the tow balls 20, 22 may be threadingly secured to the coupling apparatus arm 14.

The base is configured to be removably attached to a vehicle, for example via mounting bracket 106 (FIGS. 2-4) in opposite first and second positions. The first tow ball 20 is in an upright orientation when the base 12 is attached to a vehicle in the first position, and the second tow ball 22 is in an upright orientation when the base 12 is attached to a vehicle in the second position. The illustrated base 12 includes a pair of openings 16 extending therethrough. The openings 16 are configured to align with respective openings in a mounting bracket (e.g., openings 107 in bracket 106) and fasteners 92, such as pins, rods, bolts, etc., are inserted through the aligned mounting bracket openings 107 and the openings 16 in the base 12 to secure the base to the mounting bracket 12.

Figure 6:
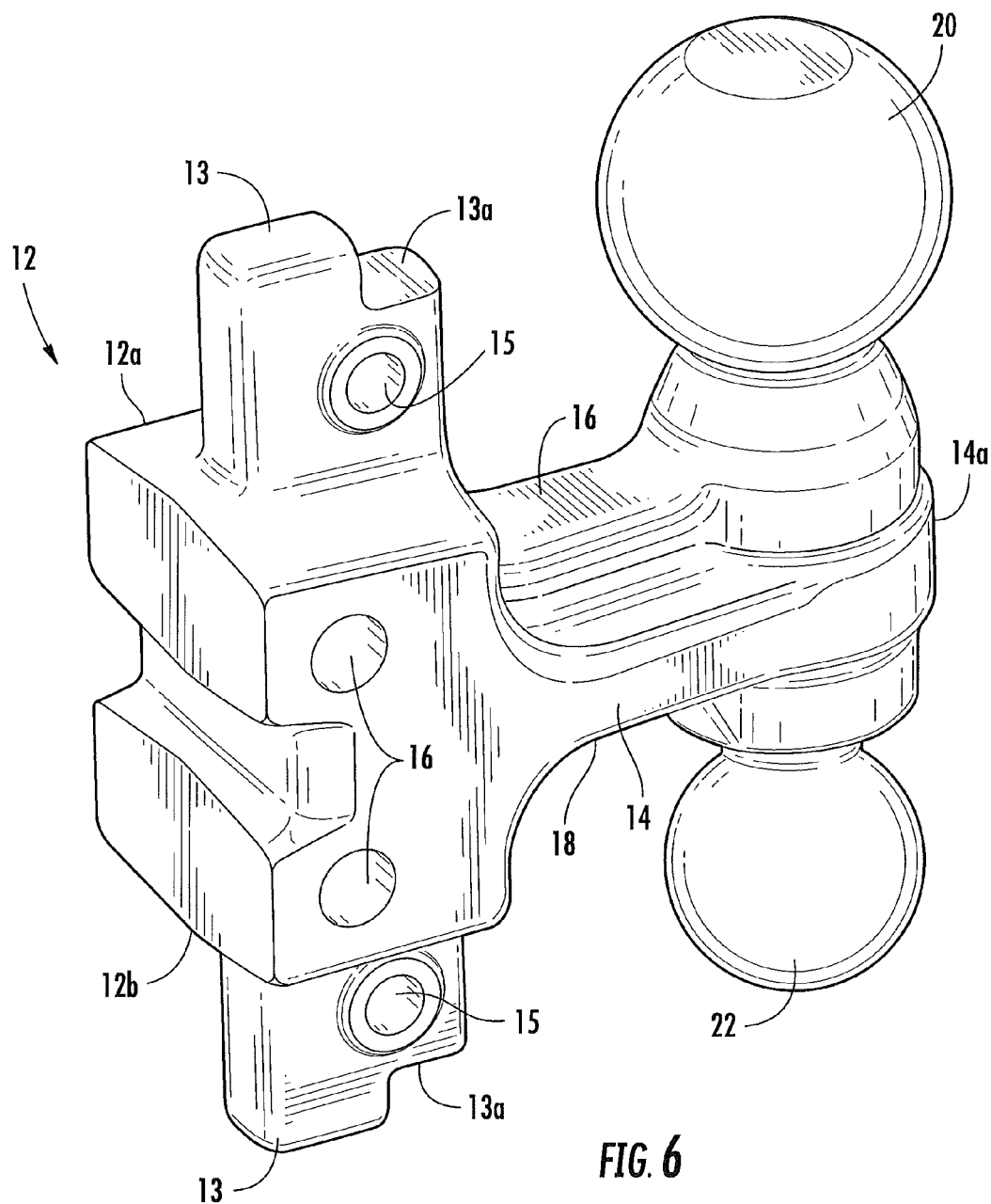
FIG. 6 is a top perspective view of the coupling apparatus of FIG. 1 with the retainer assembly removed therefrom.

The base 12 also includes opposite first and second end portions 12a, 12b, as illustrated in FIG. 6. Each of the first and second end portions 12a, 12b of the base 12 includes a respective post 13 extending outwardly therefrom. Each post includes a notch 13a formed therein and an opening 15 extending therethrough. As will be described below, a retainer assembly 30 is configured to be removably and rotatably attached to each post 13.

Embodiments of the present invention are not limited to the illustrated shape and configuration of the base 12 and arm 14, or to the illustrated shape and configuration of the posts 13 extending from respective end portions 12a, 12b of the base 12. The base 12 and arm14 may have various shapes and configurations without limitation. Moreover, the base 12 may be removably secured to a vehicle in various ways. Embodiments of the present invention are not limited to the use of the illustrated openings 16 and fasteners 92 for securing the base 12 to a mounting bracket 106. Various other ways of removably securing the base 12 to a vehicle may be utilized without limitation.

Figure 5A:
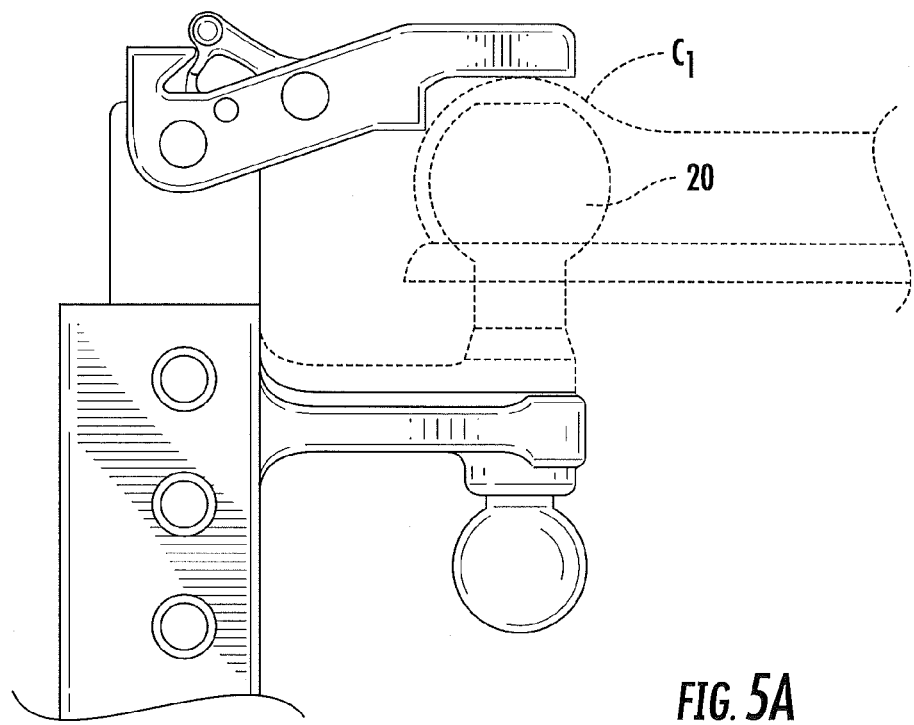
FIG. 5A is a side view of the coupling apparatus of FIG. 1 with a ball coupler of a trailer attached to one of the tow balls of the coupling apparatus and with the retainer assembly latch in the locked position.
Figure 5B:
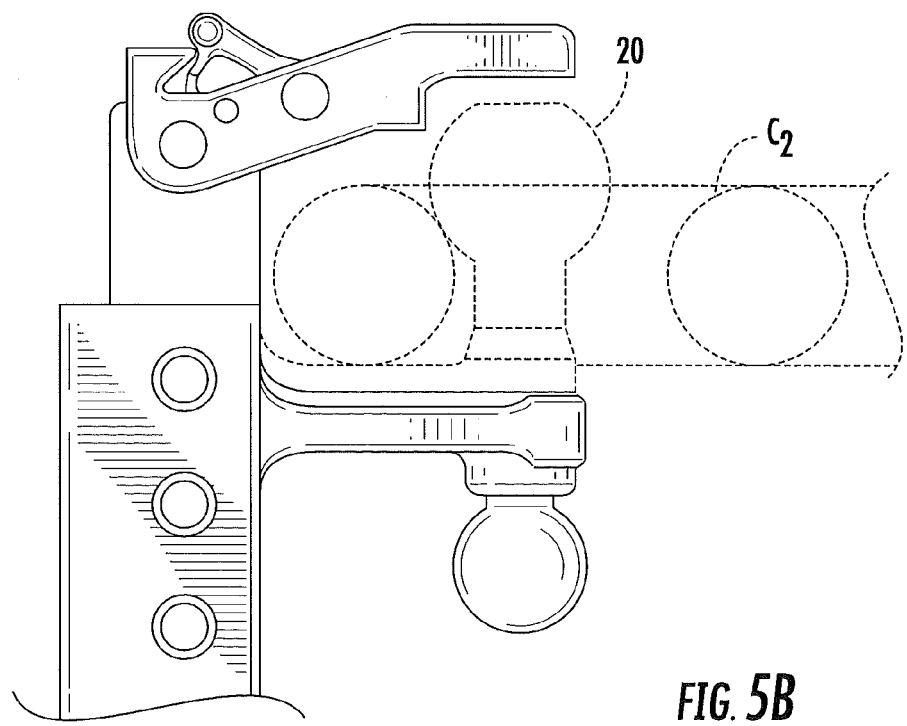
FIG. 5B is a side view of the coupling apparatus of FIG. 1 with a ring coupler of a trailer attached to one of the tow balls of the coupling apparatus and with the retainer assembly latch in the locked position.
Figure 7:
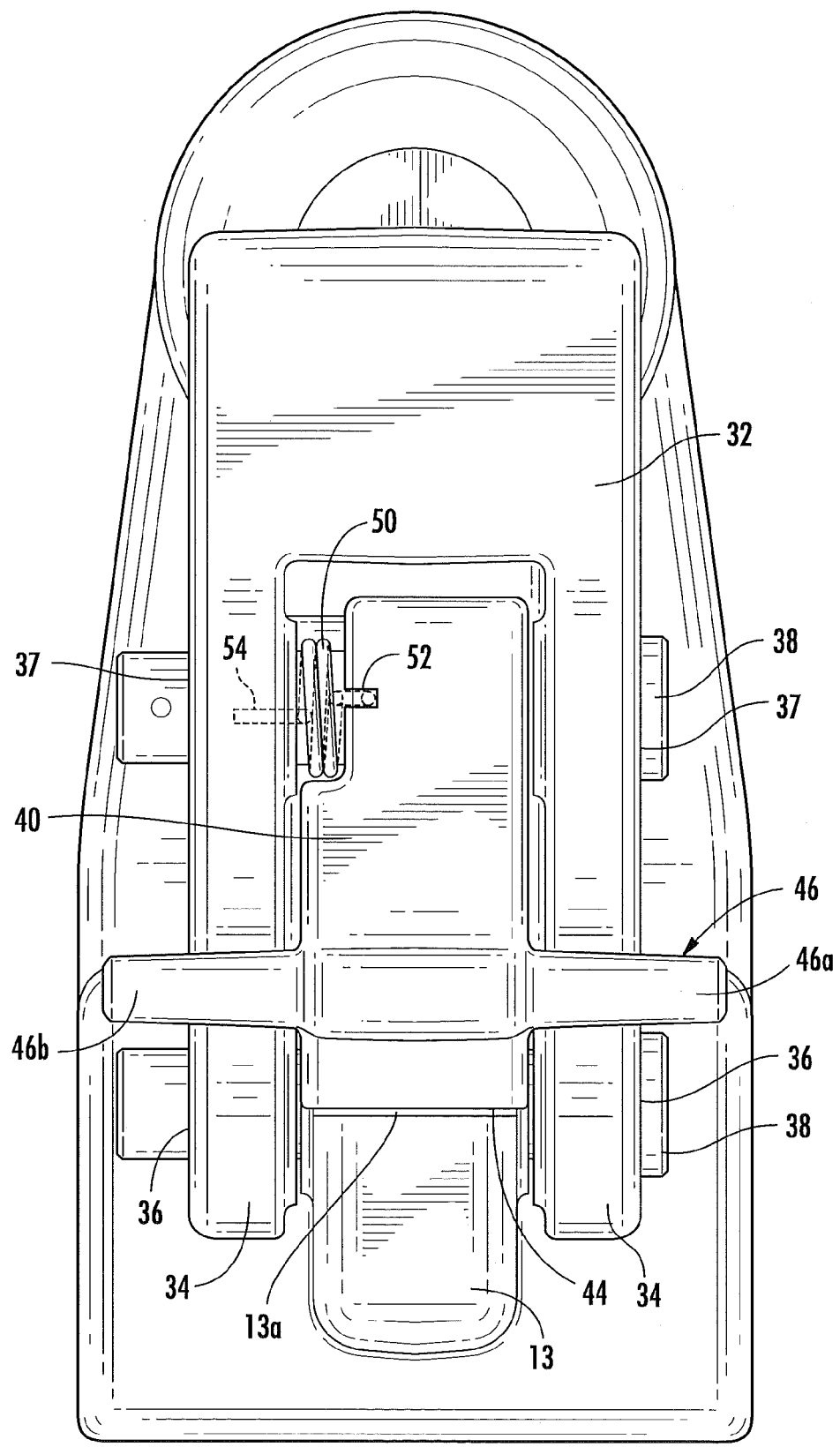
FIG. 7 is a top plan view of the coupling apparatus of FIG. 1.

The illustrated coupling apparatus 10 also includes a retainer assembly 30 removably attachable to the base 12, as illustrated in FIGS. 1 and 7. The retainer assembly 30 includes a latch 32 that is configured to retain an object (e.g., a coupler associated with a trailer or other towed vehicle) extending around the first tow ball 20 when the first tow ball 20 is in an upright orientation and that is configured to retain an object extending around the second tow ball 22 when the second tow ball 22 is in an upright orientation. For example, as illustrated in FIG. 5A, a ball coupler $C_1$ of a trailer is secured to the tow ball 20 and the retainer assembly 30 prevents the ball coupler from becoming unintentionally disengaged from the tow ball 20. As illustrated in FIG. 5B, a ring coupler $C_2$ of a trailer is secured to the tow ball 20 and the retainer assembly 30 prevents the ring coupler $C_2$ from becoming unintentionally disengaged from the tow ball 20.

In some embodiments of the present invention, the retainer assembly 30 may be kept in an open position and not in overlying engagement with a respective tow ball when a ball coupler $C_1$ of a trailer is secured to the tow ball. Some ball couplers may be too large or bulky and may not allow the retainer assembly 30 to be moved to a locked position overlying a respective tow bar. Moreover, ball couplers often include a device that prevents unintentional and unauthorized disengagement.

The retainer assembly 30 is configured to be removably secured to either of the posts 13 on the base first and second ends 12a, 12b. For example, the retainer assembly 30 is secured to the post 13 that is adjacent tow ball 20 when tow ball 20 is in an upright orientation and the retainer assembly is secured to the post 13 that is adjacent tow ball 22 when tow ball 20 is in an upright orientation.

The retainer assembly latch 32 includes spaced-apart wall portions 34 each having respective first, second, and third openings 36, 37, 39 formed therethrough. The latch 32 is pivotably and removably secured to a respective post 13 by aligning the first openings 36 in the latch walls 34 with the opening 15 in the post 13 and inserting a fastener 38 through the aligned openings 15, 36. Fastener 38 may be a rod, a pin, a bolt, or any other type of device that can removably secure the latch 32 to the post and permit rotatable movement of the latch 32 relative to the post 13. The latch 32 is rotatable between open and locked positions, as will be described below.

Figure 8:
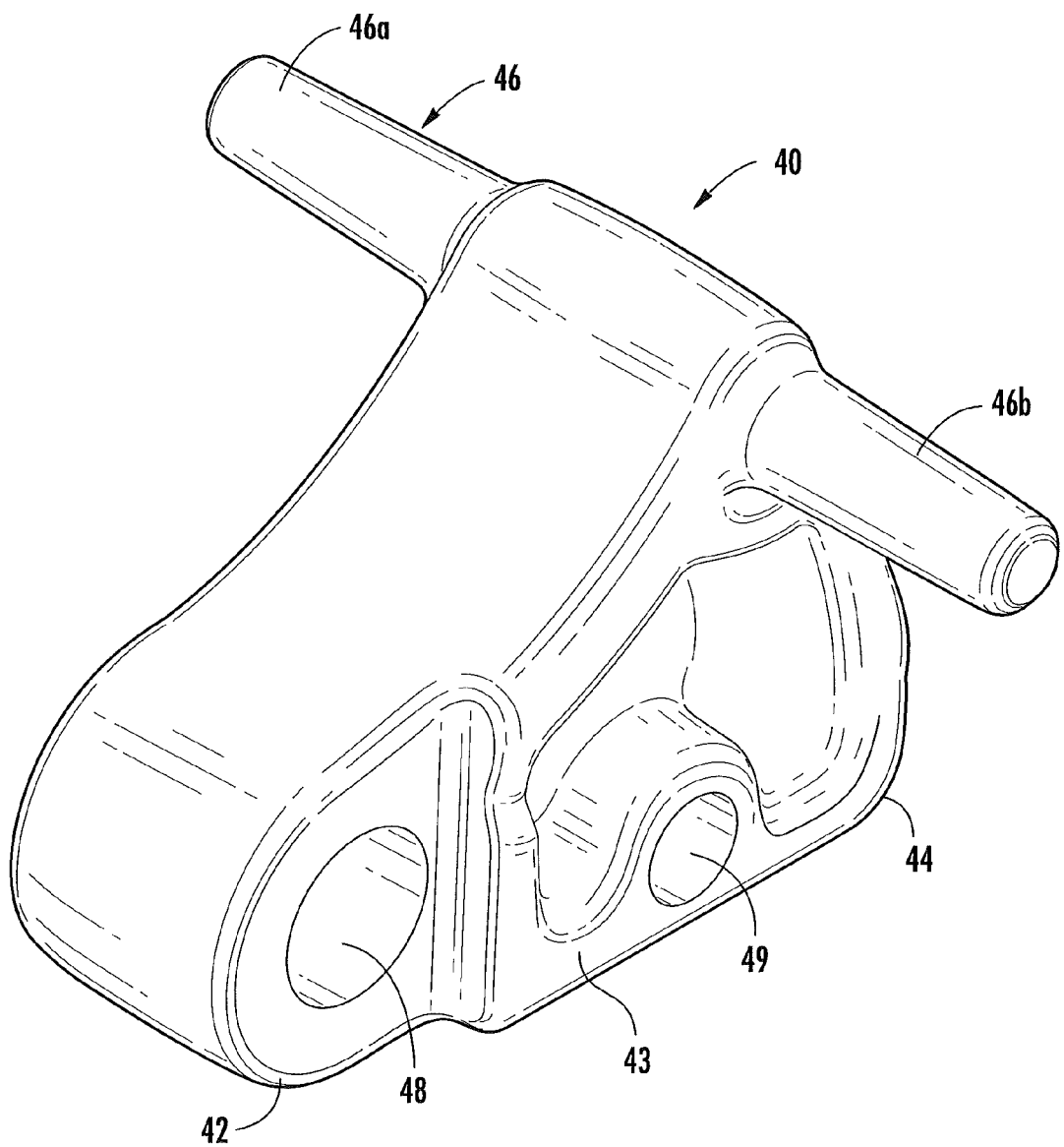
FIG. 8 is a top perspective view of the retainer assembly lever, according to some embodiments of the present invention.

The retainer assembly 30 also includes a lever 40 that is operably associated with the latch 32 and that is configured to move the latch 32 between open and locked positions. Referring to FIG. 8, the lever 40 includes opposite first and second end portions 42, 44. The illustrated lever 40 also includes a handle 46 with opposite first and second portions 46a, 46b. A first opening 48 is formed through the lever 40 at the first end portion and a second opening 49 is formed through a medial portion 43 of the lever 40.

As illustrated in FIGS. 1 and 7, the lever 40 is positioned between the latch walls 34 and is rotatably secured to the latch 32 via a fastener 38 that extends through the lever first opening 48 and the second openings 37 in the latch walls 34. Fastener 38 may be a rod, a pin, a bolt, or any other type of device that can pivotably secure the lever 40 to the latch 32. The lever 40 is rotatable between open and locked positions, as will be described below. As illustrated in FIGS. 1 and 7, a biasing element 50 is provided to urge the lever 40 towards the locked position. The illustrated biasing element 50 is a torsion spring with one end 52 associated with the lever 40 and an opposite end 54 associated with the latch 32. The fastener 38 that rotatably secures the lever 40 to the latch 32 is inserted through the torsion spring 50. Engagement of the torsion spring ends 52, 54 with the lever 40 and latch 32, respectively, causes the torsion spring 50 to flex as the lever 40 is moved relative to the latch 32, which produces a biasing force, as would be understood by those skilled in the art of the present invention. Various types of biasing elements may be utilized, however, Embodiments of the present invention are not limited to the illustrated torsion spring 50.

Figure 9A:
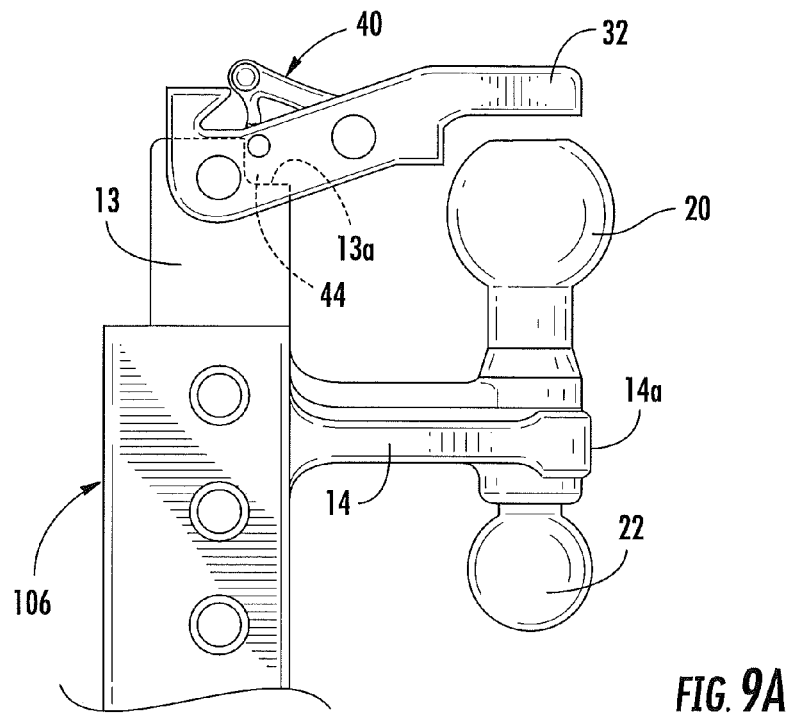
FIG. 9A is a side view of the coupling apparatus of FIG. 1 with the retainer assembly latch in the locked position overlying a tow ball, according to some embodiments of the present invention.
Figure 9B:
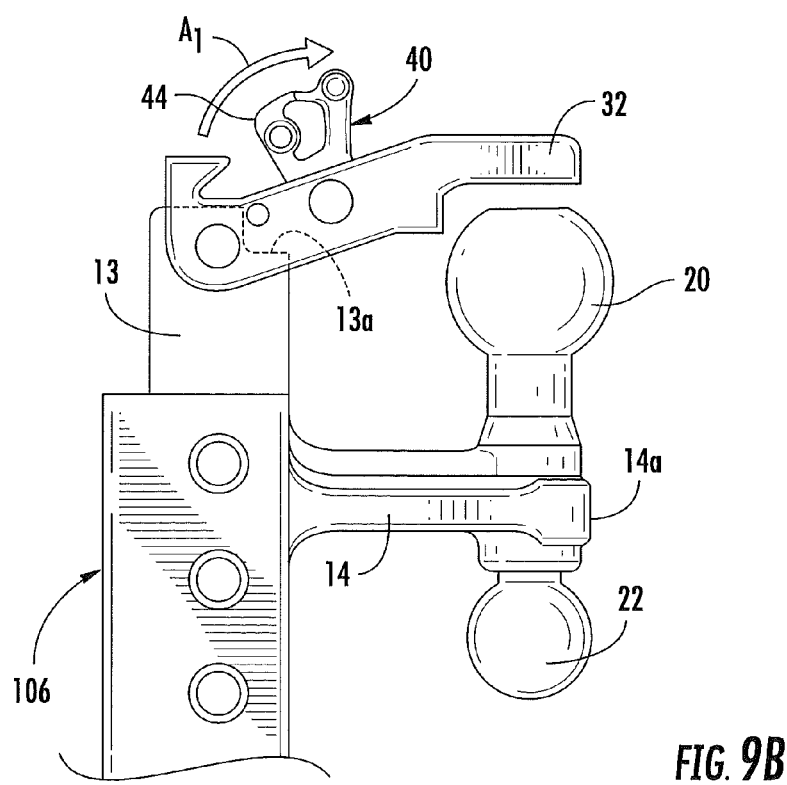
FIG. 9B illustrates the retainer assembly lever moved to an unlocked position to permit rotation of the latch.
Figure 9C:
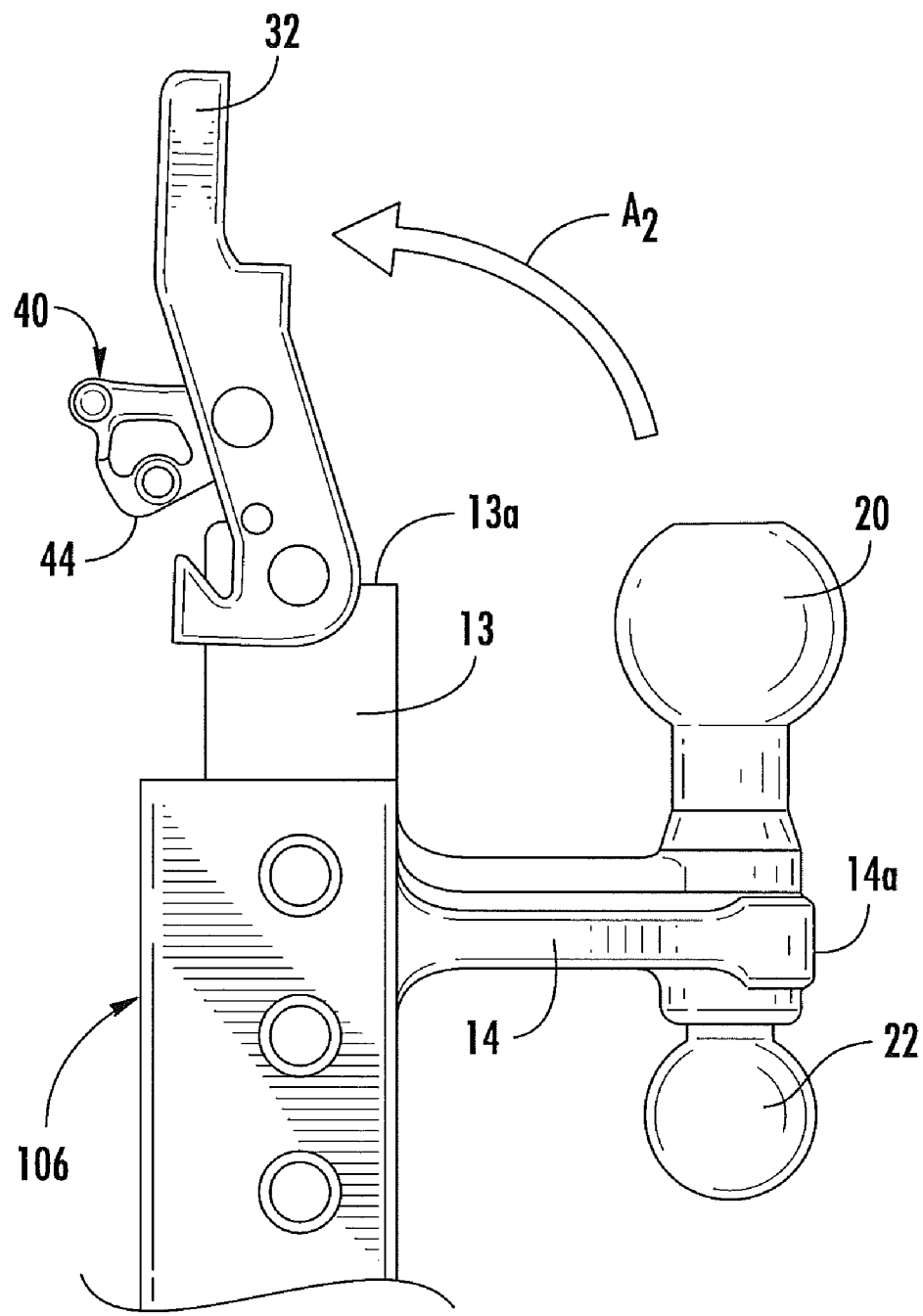
FIG. 9C illustrates the latch moved to an unlocked position away from the tow ball.

In the locked position, the lever second end portion 44 engages the notch 13a in a respective post 13 and prevents the latch 32 from pivoting, as illustrated in FIG. 9A. To allow the latch 32 to be pivoted away from overlying engagement with a respective tow ball, a user grasps the lever handle 46 and pivots the lever in the direction indicated by arrow $A_1$ in FIG. 9B. This disengages the lever second end portion 44 from the post notch 13a and allows the latch 32 to be pivoted to an open position in the direction indicated by arrow A2 in FIG. 9C.

When the lever 40 is in the locked position, opening 49 in the lever aligns with opening 39 in each latch side wall 34. A pin, a rod, or other type of device can be inserted through aligned openings 39, 49 to prevent rotation of the lever 40, as would be understood by one skilled in the art of the present invention.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A coupling apparatus, comprising:
   a base configured to be removably attached to a vehicle in opposite first and second positions, wherein the base comprises opposite first and second end portions;
   an arm extending from the base and comprising opposite first and second sides;
   a first tow ball extending from the arm first side and a second tow ball extending from the arm second side, wherein the first tow ball is in an upright orientation when the base is attached to a vehicle in the first position, and wherein the second tow ball is in an upright orientation when the base is attached to a vehicle in the second position; and
   a retainer assembly removably attachable to the base first end portion and configured to retain an object extending around the first tow ball when the first tow ball is in an upright orientation and removably attachable to the base second end portion and configured to retain an object extending around the second tow ball when the second tow ball is in an upright orientation.

2. The apparatus of claim 1, wherein the retainer assembly comprises a latch that is rotatable between open and locked positions.

3. The apparatus of claim 1, wherein the base comprises at least one opening formed therein and further comprising at least one fastener configured to be retractably extendable through the at least one opening to removably attach the base to a vehicle.

4. The apparatus of claim 1, wherein each of the first and second end portions of the base comprises a respective post, and wherein the retainer assembly is configured to be removably attached to the respective post.

5. The apparatus of claim 4, wherein the retainer assembly comprises a latch that is rotatable on the respective post between open and locked positions.

6. The apparatus of claim 5, wherein the retainer assembly further comprises a lever operably associated with the latch that is configured to move the latch between open and locked positions.

7. The apparatus of claim 6, wherein the lever has an end portion that engages the respective post to maintain the latch in the locked position, and wherein the lever is rotatable relative to the latch such that the lever end portion disengages the post and the latch can be moved to an open position.

8. The apparatus of claim 7, wherein the retainer assembly further comprises a biasing element that urges the lever end portion into engagement with the respective post.

9. The apparatus of claim 7, wherein the lever comprises a handle for rotating the lever relative to the latch for disengaging the lever end portion from the post.

10. The apparatus of claim 1, wherein the first and second tow balls have respectively different sizes.

11. A coupling apparatus, comprising:
    a base comprising opposite first and second end portions, wherein each of the first and second end portions comprises a respective post, and wherein the base is configured to be removably attached to a vehicle in opposite first and second positions;
    an arm extending from the base and comprising opposite first and second sides;
    a first tow ball extending from the arm first side and a second tow ball extending from the arm second side, wherein the first tow ball is in an upright orientation when the base is attached to a vehicle in the first position, and wherein the second tow ball is in an upright orientation when the base is attached to a vehicle in the second position; and
    a retainer assembly that is removably attachable to the respective post at the base first end portion and configured to retain an object extending around the first tow ball when the first tow ball is in an upright orientation and that is removably attachable to the respective post at the base second end portion and configured to retain an object extending around the second tow ball when the second tow ball is in an upright orientation, wherein the retainer assembly comprises a latch that is rotatable between open and locked positions.

12. The apparatus of claim 11, wherein the retainer assembly further comprises a lever operably associated with the latch that is configured to move the latch between open and locked positions.

13. The apparatus of claim 12, wherein the lever has an end portion that engages the respective post to maintain the latch in the locked position, and wherein the lever is rotatable relative to the latch such that the lever end portion disengages the post and the latch can be moved to an open position.

14. The apparatus of claim 13, wherein the retainer assembly further comprises a biasing element that urges the lever end portion into engagement with the respective post.

15. The apparatus of claim 13, wherein the lever comprises a handle for rotating the lever relative to the latch for disengaging the lever end portion from the post.

16. The apparatus of claim 11, wherein the first and second tow balls have respectively different sizes.

17. The apparatus of claim 11, wherein the base comprises at least one opening formed therein and further comprising at least one fastener configured to be retractably extendable through the at least one opening to removably attach the base to the vehicle.

* * * * *